United States Patent [19]
Li

[11] Patent Number: 5,244,580
[45] Date of Patent: Sep. 14, 1993

[54] METHOD OF REMOVAL AND RECOVERY OF OIL AND GREASE FROM WASTEWATER

[76] Inventor: Chung-Lee Li, No. 8, Shih-Shan Tien, Lung-Hsing Tsun, Chung-Pu Hsiang, Chia-Yi Hsien, Taiwan

[21] Appl. No.: 820,314
[22] Filed: Jan. 10, 1992
[51] Int. Cl.$^5$ .............................................. C02F 1/28
[52] U.S. Cl. .................................. 210/666; 210/671; 210/674; 210/691; 210/695
[58] Field of Search ............... 210/664, 666, 671, 674, 210/691, 924, 695

[56] References Cited

U.S. PATENT DOCUMENTS 4,187,187  2/1980  Turbeville ........................... 210/924
4,234,420  11/1980 Turbeville ........................... 210/924

FOREIGN PATENT DOCUMENTS 53-17592  2/1978  Japan .
53-55658  5/1978  Japan .
53-60887  5/1978  Japan .

OTHER PUBLICATIONS

Boyd, Thomas E.; Cusick, Michael J.; and Navratil, James D.; *Recent Developments in Separation Science;* vol. VIII; Chapter 6; "Ferrite Use in Separation Science and Technology"; pp. 207–232; CRC Press, Inc.; Florida; 1986.

*Primary Examiner*—Ivars Cintins
*Attorney, Agent, or Firm*—Ladas & Parry

[57] ABSTRACT

There is disclosed a method of removal and recovery of oil and grease from wastewater wherein ferrite powders are used to adsorb the oil and grease contained in the wastewater, and then the oil and grease are separated from the wastewater by an external magnetic field. The ferrite powders are individually recovered for re-use.

17 Claims, 3 Drawing Sheets

METHOD OF REMOVAL AND RECOVERY OF OIL AND GREASE FROM WASTEWATER

BACKGROUND OF THE INVENTION

This invention relates to a method of removal and recovery of oil and grease from wastewater, in particular, to a method using spinel ferrite powder, which possesses strong surface activity but is insoluble in weak acid or alkaline, whereby the powder is added to the waste to adsorb the oil and grease contained in waste and then to separate solid powder and liquid by an external magnetic field.

There are two types of oil and grease which cause water pollution: one is animal and plant fat, and the other is mineral oil, such as petroleum oil and refined oil. Owing to their lower densities, oil or grease will not mix well with water and therefore becomes an immiscible film suspended on the water surface. This film will inhibit the dissolving of oxygen in water and reduce the dissolving capacity of oxygen in water. The result will result in serious environmental problems.

Wastewater containing oil and grease is often effused from petroleum refineries and chemical plants. Generally speaking, the mixture of oil and water can be classified as suspended oil, dispersed oil, emulsified oil, etc. The suspended oil can be removed through gravity separation methods, such as American Petroleum Institute separator (API), Corrugated-Plates Interceptor (CPI) and Parallel-Plates Interceptor (PPI). When free oil or oil moiety suffers mechanical impact, the oil will either form particles and emulsify; or will meet a surface activator and become a stable emulsifion which cannot be treated through gravity separation methods. In addition, water soluble machine oil or cut oil is now used in several plants to enhance the technology of mechanical processes. Owing to the chemical effects of a surface activator, said oil waste becomes emulsified and the size of the dispersed oil particle is in the range of several ums, does not possess upward buoyancy and will stably disperse in water. Animal and plant oil wastes from a food cannery easily became emulsified and cannot be handled easily.

There currently exists several separation methods of oil and wastewater, and treatments of oil and grease decomposition which are shown in Table 1. The methods are used to treat water soluble oil and grease containing adsorption of membrane, biological, active carbon, etc. Owing to technical problems and economic reasons, the practical methods are limited.

TABLE 1

| Oil-removal processes summary | | |
|---|---|---|
| Process | Advantages | Disadvantages |
| Gravity separation (API separators, CPI separators, PPI separators) | Economical Simple operation | Limited efficiency Susceptible to weather conditions Removes little or no soluble oil Limited removal of emulsified oil |
| Air flotation (DAF & IAF) | Handles high solids Reliable process (handles shock load) | Chemical sludge disposal when coagulants are used (DAF only) Requires chemicals |
| Chemical coagulation-Flocculation and sedimentation | Handles high solids | Excessive Chemical sludge produced Not cost-effective |

TABLE 1-continued

| Oil-removal processes summary | | |
|---|---|---|
| Process | Advantages | Disadvantages |
| Coalescers (plate, fibrous and loose media) | High potential efficiency | Cannot handle high solids due to fouling |
| Membrane processes | Soluble oil removal | Low flux rates Membrane fouling and questionable membrane life Not demonstrated as a practical process for oil and grease removal |
| Biological | Removes soluble oil Relatively high tolerance for oil and grease | Solids carryover Prone to upset Pretreatment prerequisite |
| Carbon adsorption | Removes soluble oil High potential efficiency | Expensive Regeneration required Requires extensive pretreatment Full-scale operation not proven in refinery Energy-intensive |

In addition, ferrites or other ferromagnetic materials in conjunction with hydrophobic material has been used to separate oil from water. Adsorption appears to the primary mechanism operation in the removal of oil by ferrites or other ferromagnetic materials. Conventionally, polystyrene beads were coated or impregnated with ferrite or other ferromagnetic material. When these beads were spread in water containing oil, the polystyrene adsorbed the oil without dissolving or otherwise mixing with the aqueous phase. The beads were subsequently removed magnetically by means of the ferrite. Finally, the oil can be removed by incineration of the ferrite used. In fact, the temperature of incineration is about 400°–500° C. and will somewhat influence the magnetism of the ferrites or other ferromagnetic materials. Hence, it is difficult for these materials to be reused.

The present invention is to provide a highly efficient, low cost, new economical technology for treating and recovering oil and grease from wastewater. The method disclosed in the present invention not only treats suspended oil, dispersed oil and emulsified oil in wastewater by solving some technological difficulties, but also recovers the oil and grease for re-use to meet the purposes of cost saving and waste reduction. More importantly, the recovered ferrite or other ferromagnetic material does not suffer high temperature alteration as occurs in the conventional methods.

SUMMARY OF THE INVENTION

It is therefore an object of the present invention to provide a method of removal and recovery of oil and grease from waste, which mitigates the environmental problems and drawbacks of conventional technology.

Another object of the present invention is to provide a novel method which employs magnetic ferrite powder in separating solid and liquid by an external magnetic field.

A further object of the present invention is to provide a method which employs the spinel ferrite powder with stable and temperature resistant properties and with concentrations of other ions to treat different wastewater containing oil and grease discharged from refining, chemical and food industries.

Yet another object of the present invention is to provide a removal and recovery method which allows for the recovery and repeated use of the ferrite powder, especially the used spinel ferrite powders and solvents in order to save material and reduce operating cost.

It is another object of the present invention to provide a method which solves environmental problems without producing any sludge, recovers oil and grease contained in waste for re-usage, and saves on material costs.

It is still a further object of the present invention to provide a method of removal and recovery oil and grease from waste, which can be operated continuously and requires space little.

These and other objects, advantages and features of the present invention will be more fully understood and appreciated by reference to the written specification and appended drawings.

BRIEF DESCRIPTION OF THE DRAWINGS

The present invention will be further explained with reference to the annexed drawings, wherein.

DETAILED DESCRIPTION OF THE INVENTION

Figure 1:
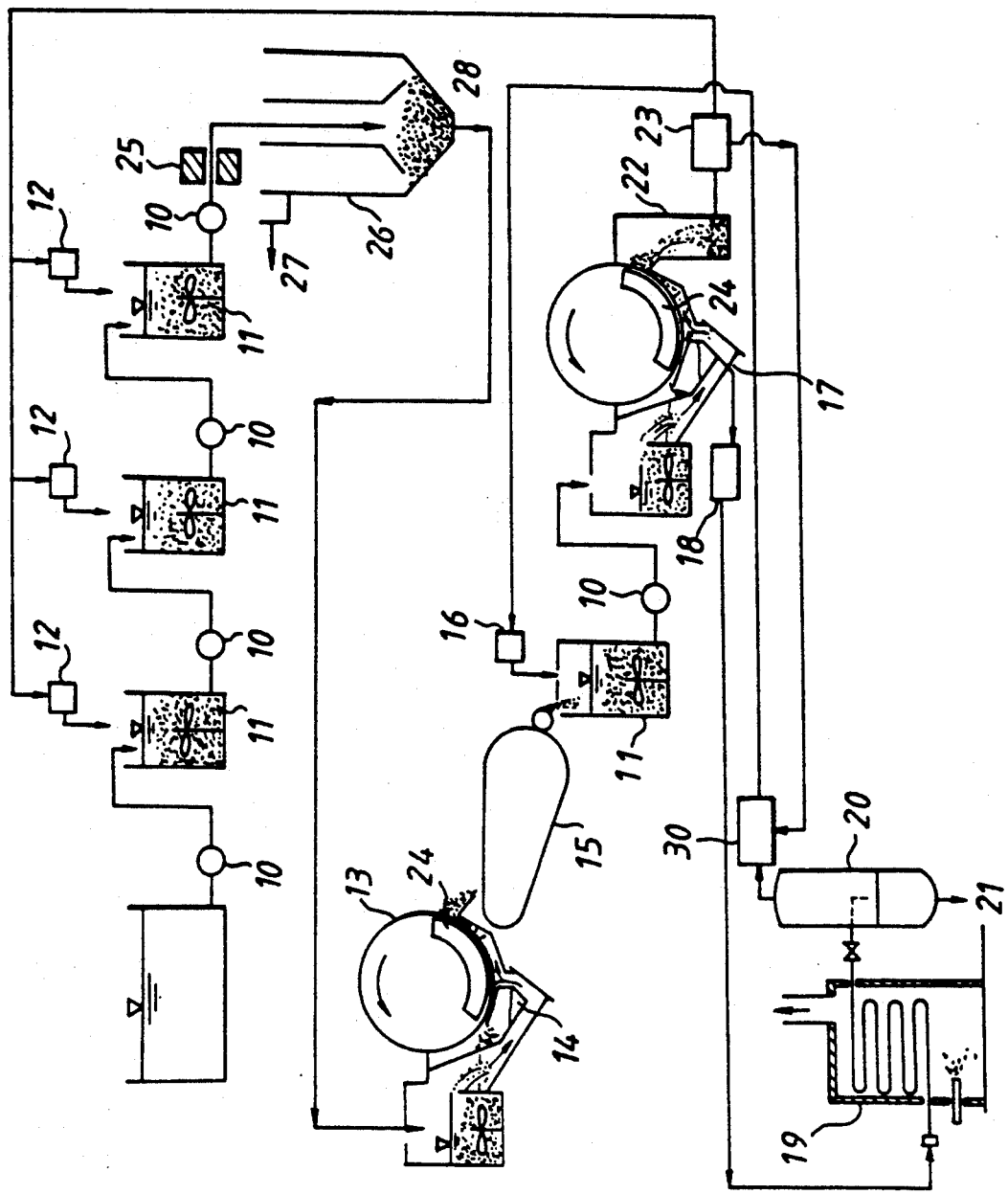
FIG. 1 is a schematic view showing the method of removing and recovering oil and grease from wastewater in accordance with the present invention.

This present invention relates to a method of removing and recovering oil and grease contained in wastewater by using ferrite powder added thereto to adsorb the oil and grease from wastewater and then to re-dissolve the oil and grease in an organic solvent for recovery. The ferrite powder and the organic solvent of the present invention can be used repeatedly. Furthermore, the recovered oil and grease can then be utilized as fuel. The process in accordance with this invention comprises the steps of:

(a) adding ferrite powders into wastewater to adsorb the oil and grease contained therein and then stirring vigorously;

(b) separating solid powder from the wastewater through use of an external magnetic field;

(c) dewatering the magnetic powders of step (b) and then adding organic solvents to re-dissolve the oil and grease adsorbed by said magnetic powders;

(d) vigorously stirring the mixture of the magnetic powders and organic solvents and separating solid and liquid by an external magnetic field;

(e) distillating the liquid obtained in step (d) to separate and recover the organic solvents and oil and grease; and (f) heating the magnetic powders to evaporate residual solvents and recover the magnetic powders.

The method of removing oil and grease in the present invention utilizes spinel ferrite powder having strong surface activity to adsorb oil and grease in the wastewater. The spinel ferrite powders having good magnetism can be separated from the liquid by an external magnetic field so as to separate solid powder and liquid, i.e., to remove oil.

The magnetic powder used in the present invention is called "spinel ferrite" powder. The formula of the spinel ferrite is $MFe_2O_4$, wherein M is a metal, such as Mg, V, Cr, Mn, Fe, Co, Ni, Cu, Zn, Cd, Ti, Pb, etc., which is normally an ion having two charges, and can also be a mixture of the above metals with two charges. Such magnetic powder can only dissolve in strong acid solutions, but will not dissolve in weak acid or alkaline solutions. That is, the magnetic powder remains stable in water and can be used to remove oil and grease from the wastewater without creating the secondary pollution problem of re-solving.

Spinel ferrite powder used in the present invention can be selected from natural minerals, such as magnetite, or from synthesized minerals. The methods used to produce synthesized minerals are classified into wet and dry methods, wherein the wet method is used to produce spinel ferrites from readily available wastewater containing heavy metals. The dry method is used to mix transition metallic oxides and ferric oxide, then to be calcined in a furnace at about 800°-1100° C. for 2 hours.

Owing to the stability of the properties of spinel ferrite powder, the influences of temperature, pH value and concentrations of other ions are very small. Hence, the spinel ferrite powder can be used in the process of the invention to remove oil and grease from wastewater and the spinel ferrite solids can then be separated from wastewater by an external magnetic field. The oil and grease adsorbed on spinel ferrite powders are recovered through suitable treatments. That is, organic solvents with low boiling points can be utilized to dissolve the adsorbed oil and grease from ferrite powder, and then oil and grease are recovered by distillation. Furthermore, the spinel ferrite powder can be re-used after heat treatment of organic solvents left on the powder. The procedures of the above steps are simple and can be completed in a short time.

The method of the invention will be described in detail as follows. FIG. 1 is a schematic flow chart view showing the present invention for removing and recovering oil and grease from the wastewater. Wastewater containing oil and grease in wastewater tank is pumped by a pump 10 into a tank 11 for adjustment. At the same time, spinel ferrite powder is added from a silo tank 12 into the tank 11 for adjustment. The mixture in the tank 11 is stirred for about 10-30 min and then pumped into another tank. Then spinel ferrite powder from another silo tank is added and the mixture is stirring for another 10-30 min. Then the above steps are repeated again for vigorous mixing. In the above multi-stage mixing process, most of the oil and grease originally contained in the wastewater are adsorbed on the spinel ferrite powder in the mixing procedure. That is, the multi-stage mixing is a multi-stage adsorption. After mixing, the resulting mixture is pumped through magnets 25 for magnetization and easy coagulation and then into a precipitation tank 26 for settling. The supernatant is discharged from an overflow 27. On the other hand, the precipitates are discharged from an outlet 28 to a magnetic separator 13 by permanent magnets 24 acting as an external magnetic field to separate solids and liquids. After the oil and grease have been removed, the wastewater is discharged into a container 14. The magnetic powder is dewatered in a dewaterer 15 and then discharged into another tank 11 for adjustment. Subsequently, the magnetic powder and organic solvent which is originally stored in a solvent tank 16 and added into the tank 11, are vigorously stirred for about 10–30 min in order to re-dissolve oil and grease into the organic solvent, which is originally adsorbed on the magnetic powders. The mixture is pumped into another tank for adjustment and discharged into another magnetic separator to separate solids and liquids. The liquid is discharged into a container 17, discharged into a filter 18 for removing residual suspended solids, heated by a heater 19 and then discharged into a distillation column 20. The heated mixture is distillated in the distillation column 20. The gaseous solvent obtained from the distillation column 20 is condensed by a condensor 30 and then sent to the solvent tank 16 for recycling. The oil liquid is discharged from an outlet 21 of the distillation column for suitable uses, such as fuel source. On the other hand, the magnetic powder is discharged into a tank 22, heated by a heater 23 to evaporate any residual solvent in the magnetic powder at a temperature of about 100° C., and discharged into the silo tanks 12 for re-use after cooling. That is, the magnetic powder can be re-added into the first tank 11 for adjustment and re-used in removing oil and grease from wastewater. If the amount of oil and grease is high, a multi-stage adsorption process as disclosed above is necessary. As noted, the portions of 10, 11 and 13 can be used in parallel for a multi-stage process, which is dependent on the amount of oil and grease contained in the wastewater.

The organic solvent used to re-dissolve the adsorbed oil and grease is suitably selected, such as petroleum ether, n-hexane, benzene, carbon tetrachloride, chloroform, Freon ethyl ether, trichloroethylene, tetrachloroethylene, 1,1,1-trichloroethane, dichloromethane, dichloroethane, FC-11 ($CCl_3F$), FC-12 ($CCl_2F_2$), FC-22 ($CHClF_2$), FC-112 ($CCl_2FCCl_2F$), FC-113 ($CCl_2FCClF_2$), and the like.

Figure 2:
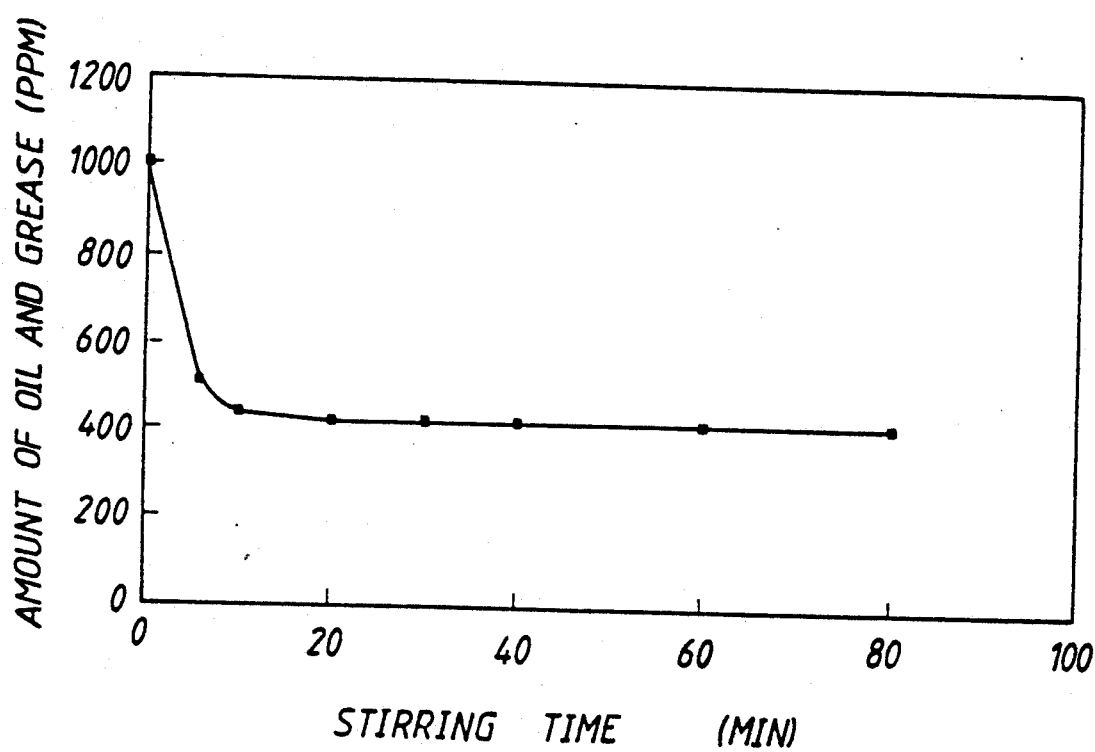
FIG. 2 is a graph showing the relationship of stirring time and the amount of oil and grease, wherein waste with 2.5 wt % additional magnetic powders is stirred at the rate of 200 rpm and at the temperature of 25° C.

Artificial wastewater containing oil and grease is used in demonstrating the method disclosed of the present invention. The concentration of oil and grease in the artificial wastewater is 1000 ppm and the spinel ferrite powder is added in the amount of 2.5% by weight. The waste and ferrite powder are stirred at the rate of 200 rpm for different times in order to proceed adsorption. The results regarding the relationship of stirring time and amount of oil and grease contained are shown in FIG. 2. From FIG. 2, it can be seen that the adsorption procedure was almost completed at about 10 min.

Figure 3:
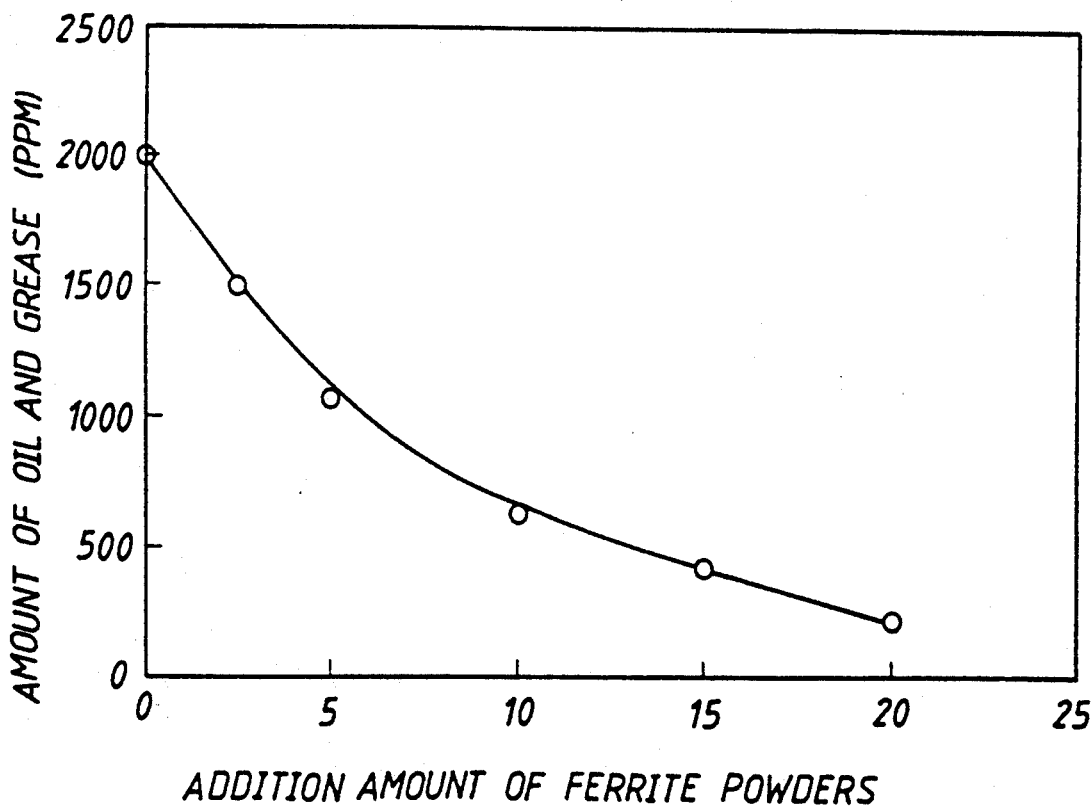
FIG. 3 is a graph showing the relationship of additional amount of spinel ferrites and amount of oil and grease, wherein the stirring time and the stirring rate are 15 min and 200 rpm, respectively.

The present invention is also demonstrated using another sample of artificial wastewater containing 2000 ppm oil and grease with a stirring rate and stirring time of 200 rpm and 15 min, respectively. The addition amount of spinel ferrite powder is changed and the results are shown in FIG. 3. The adsorption amount of oil and grease per % of the spinel ferrite decreases with respect to the increase of addition amount of spinel ferrites. For example, 189 ppm for 5 wt % of spinel ferrites decreased to 139 ppm for 20 wt % of spinel ferrite. It is clear that the efficiency of multi-stage process is better than that of single stage process.

Figure 4:
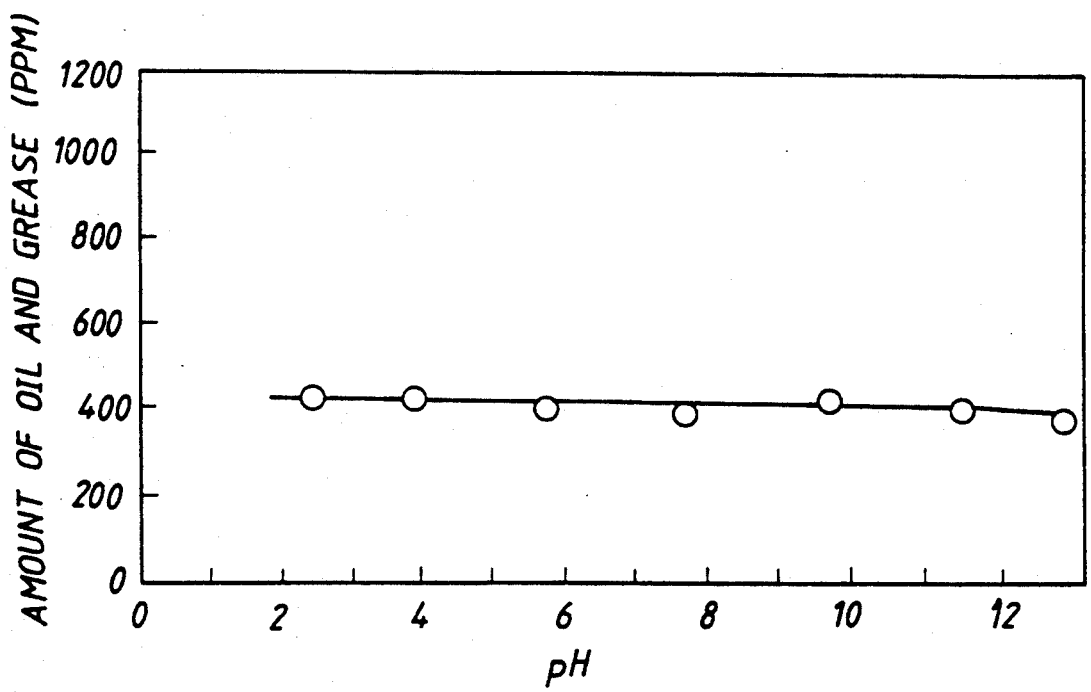
FIG. 4 is a graph showing the relationship of pH value and amount of oil and grease, wherein the waste with 2.5 wt % additional spinel ferrite powder is stirred at the rate of 200 rpm and at the temperature of 30° C. for 20 min.

Owing to the fact that the spinel ferrite powder only dissolves in strong acid, and not in weak acid or alkaline solution, the method used in the present invention is demonstrated under several different pH values. For artificial wastewater containing 1000 ppm oil and grease, the pH value thereof is adjusted between 2 and 13 and 2.5 wt % spinel ferrite powder is individually added into wastewater with different pH values. The wastewater is all placed in a thermostat to keep the temperature at a temperature of 30° C. and stirred at the rate of 200 rpm for 20 min. The results in FIG. 4 clearly show that the pH value does not influence the adsorption of oil and grease. Thus, the spinel ferrite powder is suitably used to treat wastewater containing oil and grease with pH value of from about 2 to 13.

Figure 5:
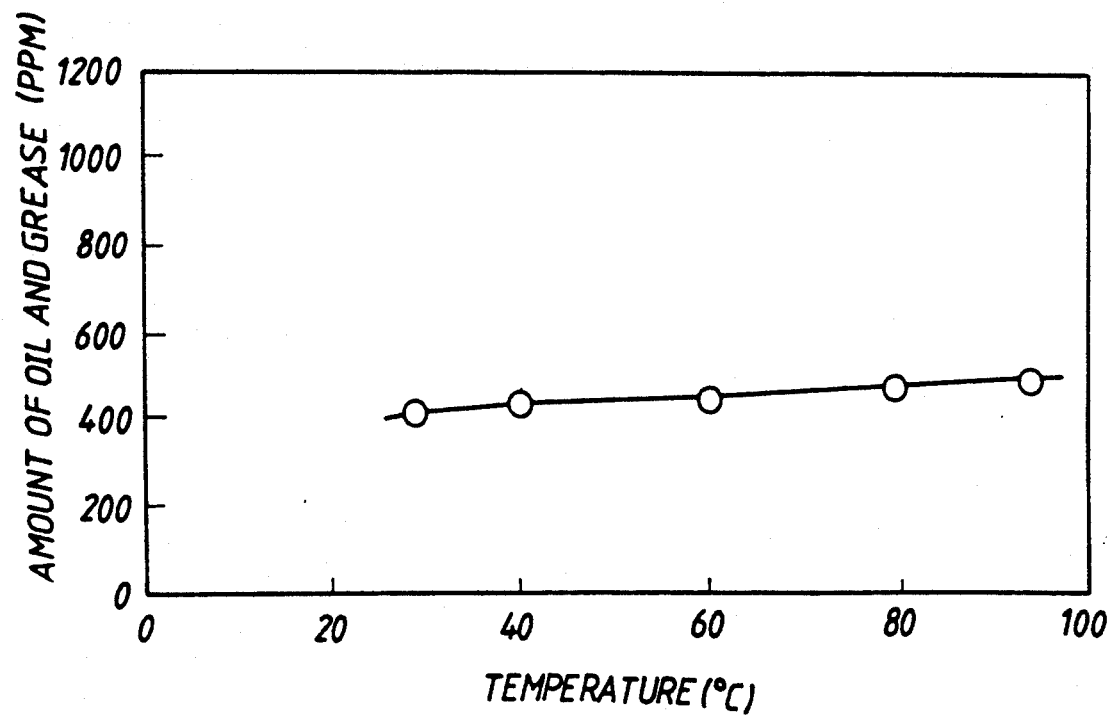
FIG. 5 is a graph showing the relationship of temperature and the amount of oil and grease, wherein the waste with 2.5 wt % additional spinel ferrites is stirred at the rate of 200 rpm at pH=7.2 for 20 min.

The temperature of wastewater discharged from some plants is slightly high. If oil and grease are effectively removed, they can be used as a heat source. Then artificial wastewater containing 1000 ppm oil and grease with pH=7.2 will be used in the foregoing process, 2.5 wt % spinel ferrite powder is added, and placed in a thermostat. The mixture is stirred at the rate of 200 rpm for 20 min at different temperatures. The relationship of temperature vs. the adsorption of oil and grease are shown in FIG. 5. It is clearly appreciated that temperature slightly influences the adsorption amount of oil and grease; for example, the adsorption amount of oil and grease will decrease at high temperature. The increase of addition amount of spinel ferrite powder will reach the effect of removing oil and grease in wastewater at relatively high temperatures. Hence, the spinel ferrite powder is suitably and preferably used to treat the wastewater containing oil and grease at the temperature of below 100° C.

The following examples are offered by way of illustration. The examples are not intended to be limiting to the scope of the invention in any respect and should not be so construed.

EXAMPLES

Example 1

After gravity separation and Dissolved Air Flotation (DAF) treatments, 500 ml of refinery wastewater from an oil refinery, containing 13.5 ppm oil and grease with pH=7.86 at the temperature of 30° C., with addition of 2.5 wt % spinel ferrite powder is used to demonstrate this process. After stirring for 20 min, the separation of solid and liquid is proceeded. Owing to the fact that some ferrite powder is very small, it can be easily suspended on the surface of the wastewater and can hardly be adsorbed by magnet, which influences the effect of removing oil and grease. Thus, polymer coagulating agents are used to coagulate the small ferrite powder. Owing to pH value of the above wastewater is in the middle range, the polymer coagulating agents can be selected from the group consisting of cation, anion and non-ion types of polymer coagulating agents. The concentration of NP-10 (a non-ion polymer coagulating agent) added into the wastewater is 40 ppm. After addition of coagulating agents, the suspended ferrite powders coagulate into much large particles which are easily adsorbed by magnets to achieve the purpose of good separation of solid and liquid. The results after treatment of the invention are shown in Table 2. It is clearly appreciated that the concentrations of oil and grease contained in waste decrease to an extreme minimum which completely satisfy effluent standards required for environmental protection.

TABLE 2

|  | Wastewater of Crude Oil Refinery | After Treatment with 2.5 wt % Ferrite Powders |
|---|---|---|
| Oil & Grease (ppm) | 13.5 | 1.2 |
| COD (ppm) | 129 | 28 |

Generally, some organic solvents are used to detect oil and grease in water, such as n-hexane, naphtha, benzene, chloroform, ethyl ester, Freon, and the like. In addition, acetone, ethanol, light oils, etc. are also good solvents for dissolving oil and grease from ferrite powder. For animal and plant oils, acetone is more preferably used. Thus, the oil and grease adsorbed on spinel ferrite powder can be extracted by the above organic solvents. For example, 10 ml Freon is added into the spinel ferrite powder and the mixture is then stirred for 10 min. The separation of solid and liquid is proceeded by an external magnetic field. After distillation in the distillation column 20, 6.5 mg oil and grease, i.e., liquid from an outlet 21, can be obtained. The used solvent, i.e., Freon, can be repeatedly used after condensation. However, after being separated from Freon, the spinel ferrite powder is heated in a heater 23 for removal of residual solvents at the temperature of 100° C. and re-used in the tanks for adjustment to remove oil and grease from the wastewater. The amount of oil and grease in the wastewater is decreased to 1.5 ppm. The above procedures can be continuously operated and repeated, according to practical requirements.

Example 2

Wastewater obtained from a particular copper electroplating plant, having 511 ppm oil and grease with pH=2.10 at the temperature of 40° C. is treated in the process. 500 ml electroplating copper with addition of 5.0 wt % spinel ferrite powder is employed to demonstrate the process of removing oil and grease contained in wastewater by repeating the steps disclosed in Example 1. The pH value of the electroplating wastewater is 2.10. Cation type or non-ion type polymer coagulating agent, such as, imidazoline (a cation type polymer coagulating agent) is selected. The concentration of imidazoline added into the wastewater is 40 ppm. Imidazoline will effectively coagulate the suspended small magnetic powder into much larger particles, for easy separation of solid and liquid while using an external magnetic field. The results after the above treatments are shown in Table 3. After treatments, the amount of oil and grease in the wastewater is reduced to 1.5 ppm, which is consistent with the effluent standards required for environmental protection.

Subsequently, n-hexane is selected to dissolve and extract oil and grease adsorbed in the spinel ferrite powder. 20 ml n-hexane is added into the magnetic powder and stirred for 10 min. The separation of solid and liquid is then proceeded. Finally, 245 mg oil and grease will be obtained after distillation, and the recovered organic solvent, i.e., n-hexane, will be reused after condensation. After residual oil is removed from spinel ferrite powders by heating, the ferrite powders can be repeatedly used in the invention. Finally, the amount of oil and grease in the wastewater is decreased to 2.2 ppm.

According to the above procedures, the spinel ferrite powder can be re-used in the method of this invention.

TABLE 3

|  | Wastewater of Electroplating Copper | After Treatment with 5.0 wt % Ferrite Powders |
|---|---|---|
| Oil & Grease (ppm) | 511 | 1.5 |
| COD (ppm) | 852 | 25 |

Example 3

Alkaline treated skimmed wastewater has obtained from a hardware plant and contained 210 ppm oil and grease with pH=12.80 at the temperature of 32° C. 500 ml of this wastewater with an addition of 5.0 wt % spinel ferrite powder is used to demonstrate the process of removal of oil and grease in the present invention. The procedures of example 1 are repeated. However, the pH value of the wastewater is 12.8. The polymer coagulating agent is selected from anion type or non-ion type, for example, sodium polyacrylate (a anion type polymer coagulating agent). The concentration of sodium polyacrylate added into the wastewater is 40 ppm, which will effectively coagulate the suspended small magnetic powder into much larger particles for easy separation of solid and liquid, while using an external magnetic field. After separation, the resultant amount of oil and grease is shown in Table 4. It is clearly appreciated that the amount of oil and grease in the wastewater is reduced to 2.0 ppm, which is consistent with effluent standards required for environmental protection.

TABLE 4

|  | Alkaline Treated Skimmed Wastewater | After Treatment with 5.0 wt % Ferrite Powders |
|---|---|---|
| Oil & Grease (ppm) | 210 | 2.0 |
| COD (ppm) | 535 | 30 |

Example 4

Wastewater obtained from a particular food plant containing 435 ppm oil and grease with pH=7.45 at the temperature of 60° C. is employed. 500 ml of the wastewater, with addition of 5.0 wt % spinel ferrite powder, is used to demonstrate the treatment for removing oil and grease contained in wastewater by repeating the steps disclosed in example 1. NP-10 type polymer coagulating agent is selected for use in this process, and the concentration thereof in the wastewater is 40 ppm, which will effectively coagulate the suspended small magnetic powder into much larger particles, for easy separation of solid and liquid while using an external magnetic field. From the results, it is clearly shown that the amount of oil and grease is reduced from 435 ppm to 4.5 ppm. On the other hand, 20 ml acetone is added into the magnetic powders for re-dissolving and extraction of the adsorbed oil and grease. After distillation, the recovered oil and grease is 195 mg. The magnetic ferrite powders, being removed from residual acetone by heating, can be re-used.

TABLE 5

| | Wastewater from Food Plants | After Treatment with 5.0 wt % Ferrite Powders |
|---|---|---|
| Oil & Grease (ppm) | 435 | 4.5 |

Of course it is understood that the above is merely a preferred embodiment of the invention and that various changes and alterations can be made without departing from the spirit and broader aspects thereof as set forth in the appended claims.

I claim:

1. A method of removal and recovery of oil and grease from wastewater comprising the steps of
   (a) adding at least one ferrite powder into wastewater to adsorb the oil and grease which are contained in said wastewater and then stirring vigorously;
   (b) separating solid magnetic powder from the wastewater by an external magnetic field;
   (c) dewatering the magnetic power of step (b) and then mixing an organic solvent or solvents with the magnetic powder to re-dissolve the oil and grease adsorbed by said magnetic powder;
   (d) vigorously stirring the mixture of the magnetic powder and organic solvents and separating solid and liquid by an external magnetic field;
   (e) distillating the liquid obtained in step (d) to separate and recover the organic solvents and oil and grease; and
   (f) heating the magnetic powder to evaporate residual solvents and recover the magnetic powder.

2. A method as set forth in claim 1, wherein the ferrite powder is a spinel-type ferrite powder.

3. A method as claimed in claim 2 wherein the formula of the spinel ferrite in the powder is $MFe_2O_4$, with M being a metal selected from the group consisting of Mg, V, Cr, Mn, Fe, Co, Ni, Cu, Zn, Cd, Ti, Pb and mixtures thereof.

4. A method as set forth in claim 1, wherein prior to step (b) a polymer coagulating agent is added into the wastewater to cause the ferrite powder to coagulate.

5. A method as set forth in claim 4, wherein the polymer coagulating agent is selected from the group consisting of cation, anion and non-ion type polymer coagulating agents.

6. A method as set forth in claim 1, wherein prior to step (b) the wastewater with the added ferrite powder is stirred for at least 10 minutes to cause adsorption of oil and grease on the ferrite powder.

7. A method as set forth in claim 1, wherein the ferrite powder added in step (a) is present in an amount of from about 0.5 to about 50% by weight.

8. A method as set forth in claim 1, wherein the amount of oil and grease adsorbed is about 80-250 ppm per one percent of ferrite powder.

9. A method as set forth in claim 1, wherein the addition of ferrite powder and stirring of step (a) are repeated a plurality of times.

10. A method as set forth in claim 1, wherein the wastewater contains mineral oils, animal fats or plant oils and the ferrite powder is used to recover said mineral oils, animal fats or plant oils.

11. A method as set forth in claim 1, wherein the pH value of the wastewater is from about 2 to about 13.

12. A method as set forth in claim 1, wherein the temperature of the wastewater is below about 60° C.

13. A method as set forth in claim 1, wherein permanent magnets are used in steps (b) and (d) as an external magnetic field.

14. A method as set forth in claim 1, wherein the organic solvent used in step (c) is selected from the group consisting of petroleum ether, n-hexane, benzene, carbon tetrachloride, chloroform, ethyl ether, trichloroethylene, tetrachloroethylene, 1,1,1-trichloroethane, dichloromethane, dichloroetheane, $CCl_3F$, $CCl_2F_2$, $CHClF_2$, $CCl_2FCCl_2F$ and $CCl_2FCClF_2$.

15. A method as set forth in claim 1, wherein the organic solvent is selected from the group consisting of light oil, chloroform, n-hexane, acetone, ethyl ether, ethanol and toluene.

16. A method as set forth in claim 1, which further comprises a step of filtering the liquid obtained in step (d) before distillation.

17. A method as set forth in claim 1, wherein the heating temperature in step (f) is at about 100° C.

* * * * *